UNITED STATES PATENT OFFICE.

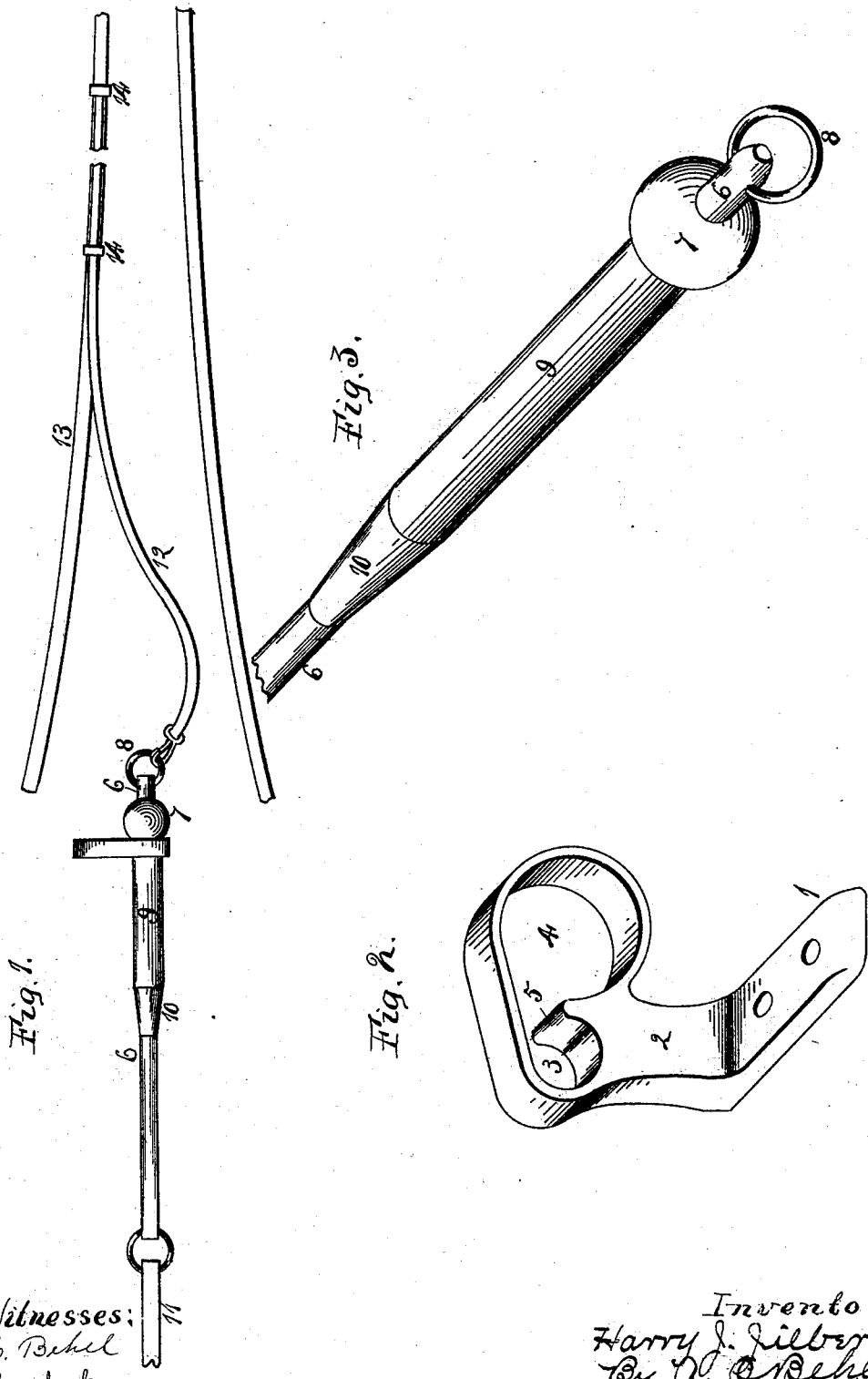

HARRY J. JILBERT, OF ROCKFORD, ILLINOIS, ASSIGNOR OF ONE-HALF TO RICHARD W. WELDON, OF SAME PLACE.

CHECKING OR UNCHECKING DEVICE.

SPECIFICATION forming part of Letters Patent No. 553,471, dated January 21, 1896.

Application filed August 8, 1895. Serial No. 558,693. (No model.)

*To all whom it may concern:*

Be it known that I, HARRY J. JILBERT, a citizen of the United States, residing at Rockford, in the county of Winnebago and State of Illinois, have invented certain new and useful Improvements in Horse Checking or Unchecking Devices, of which the following is a specification.

The object of this invention is to check and uncheck a horse without getting out of the vehicle.

In the accompanying drawings, Figure 1 is a plan view of my improvements. Fig. 2 is an isometrical representation of my improved check-hook. Fig. 3 is an isometrical representation of the end of the check-strap.

To the back-pad of a harness is secured the check-hook, consisting of the base 1 and an uprising shank 2, having openings 3 and 4, connected by a contracted opening 5, the openings extending in the lengthwise direction of the check-strap. The check-strap consists of a cylindrical shank 6, having a ball 7 secured near its end, and at the end is secured a ring 8. The shank in front of the ball has an enlarged portion 9, formed with a taper 10 to meet the size of the shank. The shank has a connection with the check-strap 11. In the ring 8 is snapped a strap 12, which is secured to the rein 13 and guided in connection therewith by loops 14. The shank portion of the check is placed within the larger opening 4, the check connected to the bridle, and the rein taken into the vehicle.

When it is desired to check the horse, the attendant draws upon the strap 12 until the small portion 6 of the shank is within the large opening. By the movement of the strap 12 the shank portion is moved through the contracted opening 5 into the smaller opening of the hook, and by allowing the horse to lower its head the enlarged portion 9 will be drawn through the opening until the ball 7 is brought in contact with the rear face of the opening, checking its further movement and holding the horse's head in proper check. The enlarged portion being larger than the contracted opening, it cannot become disengaged. In unchecking the horse, the attendant will draw upon the strap 12 until the small section of the shank will pass through the contracted opening into the larger opening. The horse in lowering its head will draw the ball through the larger opening, giving the horse the necessary freedom for drinking.

By having the tapered section 6 it will more readily enter the smaller opening.

The strap 12, being connected to the driving-rein and guided by loops, will not interfere with the driving of the horse and will always be within easy reach of the attendant.

I claim as my invention—

A checking and unchecking device consisting of a hook having two openings of different sizes and located in a horizontal plane, a horizontal passage way connecting the openings being of smaller dimensions than the smaller opening, a check rein having an extension of larger dimensions than the passage way and having an enlarged end of larger dimension than the smaller opening.

HARRY J. JILBERT.

Witnesses:
A. O. BEHEL,
E. BEHEL.